United States Patent
Nagasawa et al.

(10) Patent No.: US 10,625,603 B2
(45) Date of Patent: Apr. 21, 2020

(54) FUEL CAP

(71) Applicant: YAMAHA MOTOR POWER PRODUCTS KABUSHIKI KAISYA, Kakegawa-shi, Shizuoka (JP)

(72) Inventors: Yuki Nagasawa, Shizuoka (JP); Naoyuki Yagi, Shizuoka (JP)

(73) Assignee: YAMAHA MOTOR POWER PRODUCTS KABUSHIKI KAISYA, Shizuoka (JP)

( * ) Notice: Subject to any disclaimer, the term of this patent is extended or adjusted under 35 U.S.C. 154(b) by 242 days.

(21) Appl. No.: 15/740,828

(22) PCT Filed: Feb. 26, 2016

(86) PCT No.: PCT/JP2016/001033
§ 371 (c)(1),
(2) Date: Dec. 29, 2017

(87) PCT Pub. No.: WO2017/002280
PCT Pub. Date: Jan. 5, 2017

(65) Prior Publication Data
US 2018/0186231 A1    Jul. 5, 2018

(30) Foreign Application Priority Data

Jul. 1, 2015  (JP) ................. 2015-133123

(51) Int. Cl.
*B01D 53/02*    (2006.01)
*B60K 15/04*    (2006.01)
(Continued)

(52) U.S. Cl.
CPC .......... *B60K 15/0406* (2013.01); *B01D 53/02* (2013.01); *B01D 53/0407* (2013.01);
(Continued)

(58) Field of Classification Search
CPC ...... B01D 2253/102; B01D 2259/4516; B01D 53/02; B01D 53/0407; B60K 15/0406;
(Continued)

(56) References Cited

U.S. PATENT DOCUMENTS 3,515,108 A * 6/1970 Daigh ................. F02M 25/089
123/519
7,261,093 B2   8/2007 Groom et al.
(Continued)

FOREIGN PATENT DOCUMENTS

JP    57-57254 U    4/1982
JP    62-018688 Y2  5/1987
(Continued)

OTHER PUBLICATIONS

Official Communication issued in International Patent Application No. PCT/JP2016/001033, dated May 24, 2016.

*Primary Examiner* — Christopher P Jones
(74) *Attorney, Agent, or Firm* — Keating and Bennett, LLP (57) ABSTRACT

A fuel cap capable of preventing a reduction in breathability in a housing due to a moistened adsorbent and appropriately discharging fuel vapor includes a housing including an inner space through which vapor generated in a fuel tank flows upward from below. A granular adsorbent is disposed in the inner space of the housing. A lower air-permeable layer is disposed below the adsorbent, and an upper air-permeable layer is disposed above the adsorbent. A lower porous member is disposed between the adsorbent and the lower air-permeable layer. The lower air-permeable layer, the lower porous member, and the upper air-permeable layer respectively have a porous structure. A density of the lower (Continued)

porous member is lower than a density of the lower air-permeable layer and a density of the upper air-permeable layer.

10 Claims, 6 Drawing Sheets

(51) Int. Cl.
  *B60K 15/05* (2006.01)
  *B01D 53/04* (2006.01)
  *B60K 15/035* (2006.01)

(52) U.S. Cl.
  CPC ........ *B60K 15/05* (2013.01); *B01D 2253/102* (2013.01); *B01D 2259/4516* (2013.01); *B60K 2015/03547* (2013.01); *B60K 2015/0451* (2013.01)

(58) Field of Classification Search
  CPC .......... B60K 15/05; B60K 2015/03547; B60K 2015/0451
  See application file for complete search history.

(56) References Cited

U.S. PATENT DOCUMENTS

| | | |
|---|---|---|
| 2008/0110889 A1 | 5/2008 | Ohsawa et al. |
| 2011/0168715 A1* | 7/2011 | Erdmann ......... B60K 15/03504 220/373 |
| 2013/0000609 A1 | 1/2013 | Yamamoto et al. |
| 2016/0341156 A1* | 11/2016 | Yang .................. F02M 25/0854 |

FOREIGN PATENT DOCUMENTS

| | | |
|---|---|---|
| JP | 63-198768 A | 8/1988 |
| JP | 06-047654 U | 6/1994 |
| JP | 2002-210456 A | 7/2002 |
| JP | 2008-120287 A | 5/2008 |
| JP | 4176312 B2 | 11/2008 |
| JP | 4810406 B2 | 11/2011 |
| JP | 2013-011250 A | 1/2013 |
| JP | 2013-050047 A | 3/2013 |

* cited by examiner

FUEL CAP

BACKGROUND OF THE INVENTION

1. Field of the Invention

The present invention relates to a fuel cap attached to a fuel tank that supplies fuel to an internal combustion engine.

2. Description of the Related Art

A fuel cap having a function of removing a harmful component in vapor is used in order to prevent leakage of fuel vapor generated in a fuel tank to the outside as it is. The fuel cap described in JP 2008-120287 A includes a canister for absorbing fuel vapor in a space formed by an outer cap and an inner cap. The canister for absorbing the fuel vapor has a housing and activated carbon. The activated carbon is stored in the housing by being sandwiched by pads in an up-and-down direction. The fuel vapor generated in the fuel tank flows into the housing, a harmful component in the vapor is absorbed by the activated carbon, and the vapor is discharged to the outside.

However, in the fuel cap described above, the fuel liquefies when a temperature of the fuel vapor is lowered. When the activated carbon is moistened by the liquefied fuel, the activated carbon adheres to the pads, and breathability of the pads is reduced. As a result, it may not be possible that the generated vapor is appropriately discharged.

SUMMARY OF THE INVENTION

Preferred embodiments of the present invention provide fuel caps that are able to appropriately discharge fuel vapor.

A fuel cap according to a preferred embodiment of the present invention for attachment to a fuel tank includes a housing including an inner space through which vapor generated in the fuel tank flows upward from below, a granular adsorbent stored in the inner space, a first porous layer disposed below the adsorbent in the inner space, a second porous layer disposed above the adsorbent in the inner space, and a plate-shaped first porous member disposed between the adsorbent and the first porous layer, wherein a density of the first porous member is lower than a density of the first porous layer and a density of the second porous layer.

In this fuel cap, the fuel vapor generated in the fuel tank sequentially passes through the first porous layer, the first porous member, the adsorbent, and the second porous layer in the housing. A harmful component included in the vapor is absorbed by the adsorbent, and the vapor is discharged to the outside of the housing.

The fuel vapor may liquefy when passing through the housing. Even in such a case, the liquefied fuel is absorbed by the first porous member so that the adsorbent is unlikely to be moistened. Further, even when the adsorbent is moistened, the first porous member is disposed between the adsorbent and the first porous layer, so that the moistened adsorbent is prevented from adhering to the first porous layer. Thus, a reduction in breathability of the first porous layer is prevented.

Further, because the density of the first porous member is lower than the density of each of the first and second porous layers, even when the moistened adsorbent adheres to the first porous member, breathability of the first porous member is not largely reduced. Further, leaking of the adsorbent is prevented by the first and second porous layers having a high density.

Thus, a reduction in breathability in the housing due to moistness of the adsorbent is prevented. As a result, the fuel vapor is appropriately discharged.

The first porous member may have an elastic limit higher than an elastic limit of the first porous layer. When the fuel cap vibrates, kinetic energy of the adsorbent is absorbed by the first porous member. Thus, the adsorbent is unlikely to be crushed. Therefore, the first and second porous layers, and the first porous member are unlikely to be clogged. Thus, a reduction in breathability in the housing is prevented.

The first porous member may be made of a first sponge material. In this case, a reduction in breathability of the first porous layer due to moistness of the adsorbent is prevented easily and at low cost. Further, elasticity of the first porous member is ensured, and crushing of the adsorbent due to vibration is prevented.

The fuel cap may further include a plate-shaped second porous member disposed between the adsorbent and the second porous layer, wherein a density of the second porous member may be lower than the density of the first porous layer and the density of the second porous layer.

In this case, because the adsorbent does not directly come into contact with the second porous layer, the moistened adsorbent is prevented from adhering to the second porous layer. Thus, a reduction in breathability of the second porous layer is prevented. As a result, breathability in the housing is sufficiently ensured.

The second porous member may have an elastic limit higher than an elastic limit of the second porous layer. In the case in which the fuel cap vibrates, kinetic energy of the adsorbent is absorbed by the second porous member. Thus, the adsorbent is unlikely to be crushed. Therefore, a reduction in breathability in the housing is prevented.

The second porous member may be made of a second sponge material. In this case, a reduction in breathability of the second porous layer due to moistness of the adsorbent is easily prevented and at low cost. Further, elasticity of the second porous member is ensured, and crushing of the adsorbent due to vibration is prevented.

The fuel cap may further include a pressing member that extends along an outer edge of an upper surface of the second porous member, wherein the housing may include first and second housing members that define the inner space when bonded to each other, the adsorbent may be stored in the first housing member, and the pressing member may press down the second porous member due to the bonding of the second housing member to the first housing member.

In this case, the second porous member is pressed against the adsorbent by the pressing member. Thus, leakage of the adsorbent through an outer periphery of the second porous member is prevented.

A supporter that supports a lower surface of the pressing member may be provided to project from an inner surface of the housing. In this case, the pressing member abuts against an upper end of the supporter, so that the downward movement of the pressing member is restricted. Thus, a position of the second porous layer is stabilized, and leakage of the adsorbent is prevented.

A slit extending in an up-and-down direction may be provided in each of outer peripheral surfaces of the first and second porous members, and the supporter may extend in the up-and-down direction and be fitted into the slit. In this case, deformation of the first and second porous members by the supporter is prevented. Thus, the formation of a clearance at an outer periphery of each of the first and second porous members is prevented, and the adsorbent is further prevented from coming into contact with the first and second porous layers.

The first porous layer and the second porous layer may be made of non-woven fabric. In this case, breathability of the first and second porous layer is ensured, and leakage of the adsorbent is prevented, easily and at low cost.

Preferred embodiments of the present invention enable the fuel vapor to be appropriately discharged.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Fuel caps according to preferred embodiments of the present invention will be described with reference to the drawings.

Figure 1:
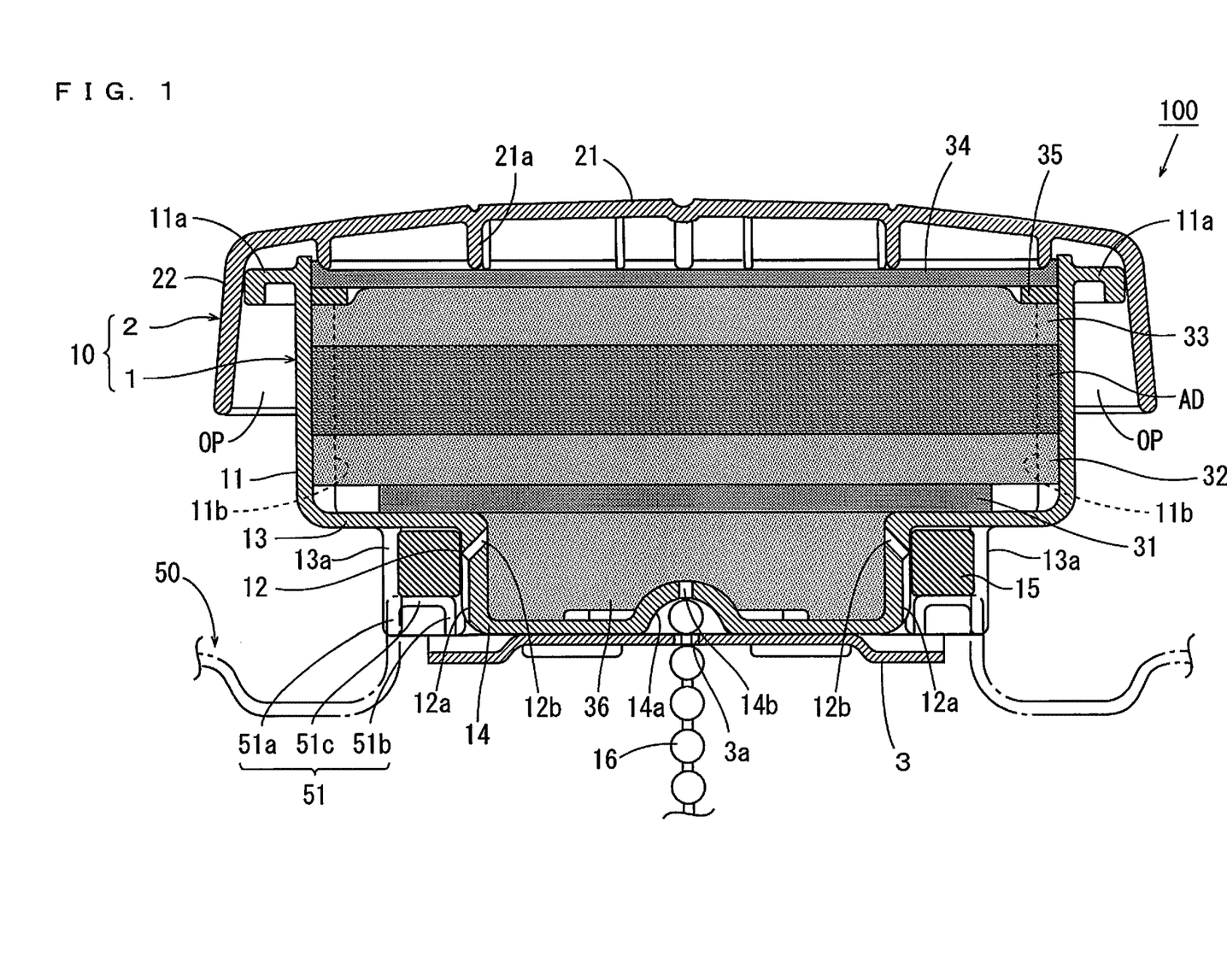
FIG. 1 is a longitudinal cross sectional view of a fuel cap according to a preferred embodiment of the present invention.

FIG. 1 is a longitudinal cross sectional view of a fuel cap according to a preferred embodiment of the present invention. The fuel cap 100 of FIG. 1 includes a housing 10. The housing 10 includes an inner housing 1 and an outer housing 2. The inner housing 1 includes a cylindrical upper side surface portion 11, a cylindrical lower side surface portion 12, an annular step portion 13 and a disc-shaped bottom surface portion 14. An inner diameter of the upper side surface portion 11 is larger than an inner diameter of the lower side surface portion 12. The step portion 13 couples a lower end of the upper side surface portion 11 to an upper end of the lower side surface portion 12. The bottom surface portion 14 is disposed to close a lower end of the lower side surface portion 12.

A plurality of projection pieces 11a are provided at an upper end of the upper side surface portion 11 to project outward. A plurality of supporters 11b extending in an up-and-down direction are provided at an inner peripheral surface of the upper side surface portion 11 to project inward. Details of the supporters 11b will be described below.

A plurality of projection pieces 13a are provided at the step portion 13 to project downward. An annular packing 15 is attached between the projection pieces 13a and the lower side surface portion 12. A plurality of grooves 12a extending in the up-and-down direction are provided at an outer peripheral surface of the lower side surface portion 12. The packing 15 adheres to the outer peripheral surface of the lower side surface portion 12 while covering an upper half of each groove 12a. A connection hole 12b is provided in the lower side surface portion 12 to obliquely extend upward and inward from an upper end of each groove 12a.

A recess 14a indented upward is provided in a center portion of the bottom surface portion 14. A connection hole 14b is provided in the recess 14a. Further, one end of a chain 16 is attached to the recess 14a. An engaging member 3 is attached to a lower surface of the bottom surface portion 14. The chain 16 hangs through a hole 3a provided at the center of the engaging member 3. The other end of the chain 16 is attached to a location inside of a fuel tank 50, described below.

Figure 2:
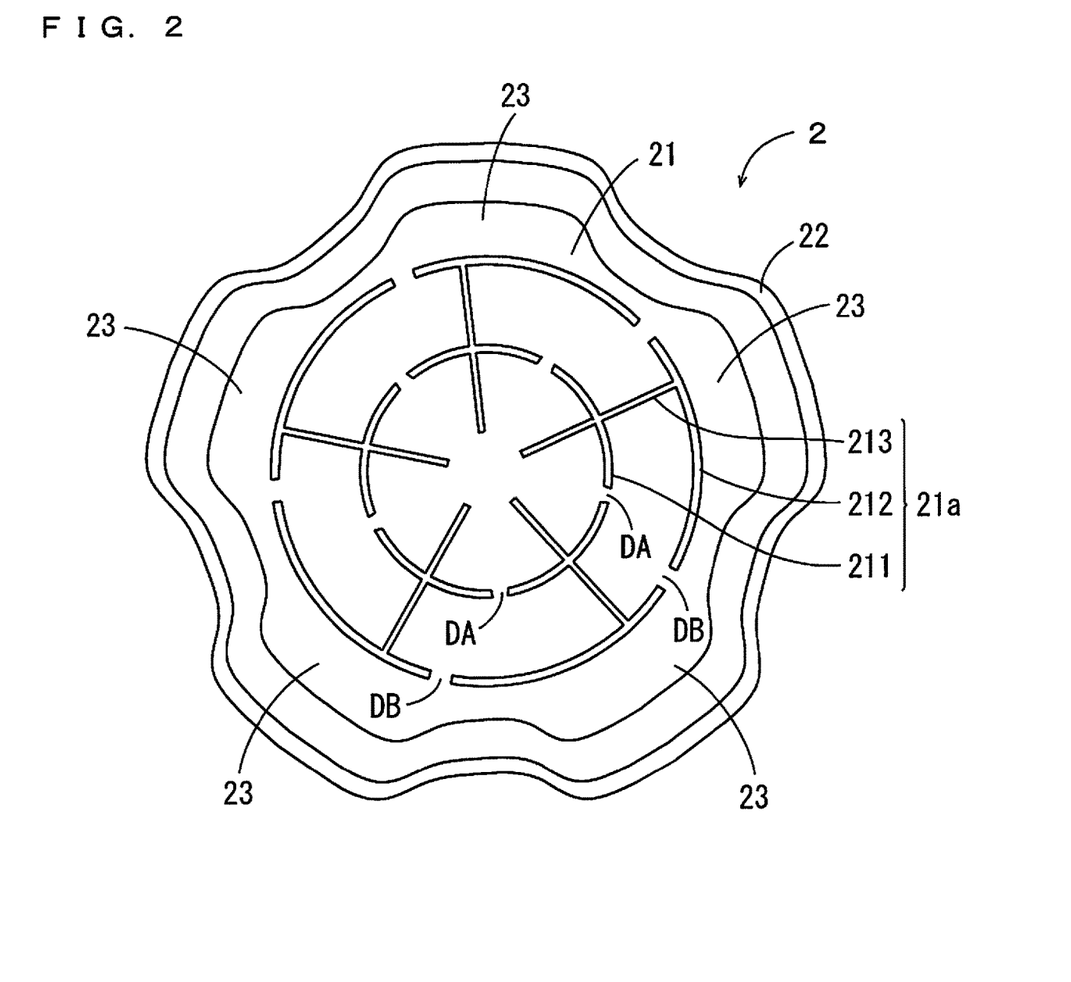
FIG. 2 is a diagram of an outer housing as viewed from below.

The outer housing 2 includes an upper surface portion 21 and a side surface portion 22. The side surface portion 22 obliquely extends outward and downward from an outer edge of the upper surface portion 21. A pressure portion 21a is provided at a lower surface of the upper surface portion 21 to project downward. FIG. 2 is a diagram of the outer housing 2 as viewed from below. As shown in FIG. 2, the pressure portion 21a includes an annular inner peripheral portion 211 and an annular outer peripheral portion 212, and a plurality (preferably five in the present example) of straight line portions 213. A center of the inner peripheral portion 211 and a center of the outer peripheral portion 212 coincide with each other, and the inner peripheral portion 211 is disposed inward of the outer peripheral portion 212. The plurality of straight line portions 213 respectively and radially extend at equal angular intervals from locations in the vicinity of the center of the inner peripheral portion 211 and the center of the outer peripheral portion 212. A clearance DA is provided in the inner peripheral portion 211, and a clearance DB is provided in the outer peripheral portion 212, between a set of the two straight line portions 213 that are adjacent to each other in a circumferential direction.

The upper surface portion 21 of the outer housing 2 includes a plurality of protruding portions 23 to correspond to the plurality of projection pieces 11a (FIG. 1) of the inner housing 1. The side surface portion 22 includes bumps and depressions and extends along outer edges of the plurality of protruding portions 23.

As shown in FIG. 1, the outer housing 2 is joined to the inner housing 1 to cover an upper half of the upper side surface portion 11 of the inner housing 1. A clearance (not shown) through which fuel vapor is able to pass is provided between the projection pieces 11a of the inner housing 1 and the side surface portion 22 of the outer housing. Further, an opening OP that leads the fuel vapor to the outside of the fuel cap 100 is provided between a lower end of the side surface portion 22 of the outer housing 2 and an outer peripheral surface of the upper side surface portion 11 of the inner housing 1.

A porous filling member 36 is disposed inside of the lower side surface portion 12 of the inner housing 1. The porous filling member 36 may be made of a sponge material, for example. A disc-shaped lower air-permeable layer 31, a disc-shaped lower porous member 32, a granular adsorbent AD, a disc-shaped upper porous member 33, and a disc-shaped upper air-permeable layer 34 are provided inside of the upper side surface portion 11 of the inner housing 1, in this order, from the bottom towards the top. The lower air-permeable layer 31 is disposed on an upper surface of the step portion 13 to close an upper opening of the lower side surface portion 12. A diameter of the lower air-permeable layer 31 is equal to or smaller than the inner diameter of the upper side surface portion 11, and is larger than the inner diameter of the lower side surface portion 12. The lower air-permeable layer 31 may be fixed to the upper surface of the step portion 13 by welding, an adhesive, or the like. The lower porous member 32 is stacked on the lower air-permeable layer 31, and the adsorbent AD is stored on the lower porous member 32 in layers. The upper porous member 33 is stacked on the adsorbent AD, and the upper air-permeable layer 34 is stacked on the upper porous member 33. A diameter of each of the lower porous member 32, the upper porous member 33, and the upper air-permeable layer 34 is preferably equal or substantially equal to the inner diameter of the upper side surface portion 11.

The lower air-permeable layer 31, the lower porous member 32, the upper porous member 33, and the upper air-permeable layer 34 respectively have a porous structure. In the present example, the lower air-permeable layer 31 and the upper air-permeable layer 34 are made of non-woven fabric, and the lower porous member 32 and the upper porous member 33 are made of a sponge material. Polyester, polypropylene, nylon, an aramid fiber or the like may be used as a material for the non-woven fabric, and polyurethane, polyester, polyethylene or the like may be used as a material for the sponge. The adsorbent AD is preferably made of activated carbon, for example.

The density of each of the lower porous member 32 and the upper porous member 33 is lower than the density of each of the lower air-permeable layer 31 and the upper air-permeable layer 34. Here, density refers to density (apparent density) including a volume of pores. The density of each of the lower porous member 32 and the upper porous member 33 is preferably not less than about 20 kg/m$^3$ and not more than about 40 kg/m$^3$, for example. The density of a sponge made of polyurethane is about 30 kg/m$^3$, for example. The density of each of the lower air-permeable layer 31 and the upper air-permeable layer 34 is preferably not less than about 90 kg/m$^3$ and not more than about 120 kg/m$^3$, for example. The density of non-woven fabric made of polyester preferably is about 107 kg/m$^3$, for example. Further, an elastic limit of the lower porous member 32 is preferably higher than an elastic limit of the lower air-permeable layer 31, and an elastic limit of the upper porous member 33 is preferably higher than an elastic limit of the upper air-permeable layer 34. The elastic limit refers to a limit of stress at which an object maintains elasticity when an external force is applied to the object, and refers to a limit point at which the shape of the object does not return to the original shape after removal of the external force.

The permeability of each of the lower porous member 32 and the upper porous member 33 is preferably higher than the permeability of each of the lower air-permeable layer 31 and the upper air-permeable layer 34. Permeability refers to the property that allows fluid such as gas, liquid, and the like to pass through. Further, a porosity of each of the lower porous member 32 and the upper porous member 33 is preferably higher than a porosity of each of the lower air-permeable layer 31 and the upper air-permeable layer 34. Further, an average bore diameter of each of the lower porous member 32 and the upper porous member 33 is preferably larger than an average bore diameter of each of the lower air-permeable layer 31 and the upper air-permeable layer 34.

The lower air-permeable layer 31 and the upper air-permeable layer 34 may be made of a material having another porous structure such as a film. Further, the lower porous member 32 and the upper porous member 33 may be made of materials different from each other, and the lower air-permeable layer 31 and the upper air-permeable layer 34 may be made of materials different from each other.

An annular pressing member 35 extends along an outer edge of an upper surface of the upper porous member 33. An outer diameter of the pressing member 35 is equal or substantially equal to the inner diameter of the upper side surface portion 11. The pressing member 35 is made of a resin such as polyacetal, for example. The pressing member 35 may be fixed to the upper air-permeable layer 34 by welding, an adhesive, or the like, or may be fixed to the upper porous member 33.

A lower end of the pressure portion 21a of the outer housing 2 is pressed against an upper surface of the upper air-permeable layer 34. In this case, the upper porous member 33 is pressed down by the pressing member 35. Thus, the lower air-permeable layer 31, the lower porous member 32, the adsorbent AD, the upper porous member 33, and the upper air-permeable layer 34 are stored densely in the up-and-down direction in the inner housing 1. Therefore, leakage of the adsorbent AD from an outer edge of the lower porous member 32 or an outer edge of the upper porous member 33 is prevented.

The lower porous member 32 and the upper porous member 33 are preferably stored in the inner housing 1 while being compressed in the up-and-down direction such that the adsorbent AD is appropriately held. That is, the thickness of each of the lower porous member 32 and the upper porous member 33 being stored in the housing 10 shown in FIG. 1 is preferably smaller than the thickness of each of the lower porous member 32 and the upper porous member 33 under an atmospheric pressure. The thickness of each of the lower porous member 32 and the upper porous member 33 under an atmospheric pressure is preferably not less than about 2 mm and not more than about 5 mm, and preferably is set to about 3 mm, for example.

As shown in FIG. 1, the fuel cap 100 is attached to the fuel tank 50. The fuel tank 50 preferably has a substantially cylindrical cap attachment portion 51 that opens upward. An upper end of the cap attachment portion 51 preferably has a substantially U-shaped cross section and be bent inward, and includes an outer periphery 51a, an inner periphery 51b and an upper edge 51c. The inner periphery 51b is positioned in the outer periphery 51a, and an upper end of the outer periphery 51a and an upper end of the inner periphery 51b are coupled to each other by the upper edge 51c.

An upper surface of the upper edge 51c adheres to a lower surface of the packing 15. A lower end of the inner periphery 51b is engaged with an upper surface of the end of the engaging member 3. The chain 16 extends into the fuel tank 50. The fuel cap 100 is connected to the fuel tank 50 via the chain 16.

Fuel vapor generated in the fuel tank 50 with the fuel cap 100 attached to the fuel tank 50 (the state of FIG. 1) is led into the housing 10 through the grooves 12a and the connection holes 12b of the lower side surface portion 12 of the inner housing 1, and the connection hole 14b of the bottom surface portion 14. In this case, leakage of the fuel vapor between the fuel tank 50 and the fuel cap 100 is prevented by the packing 15.

Figure 3:
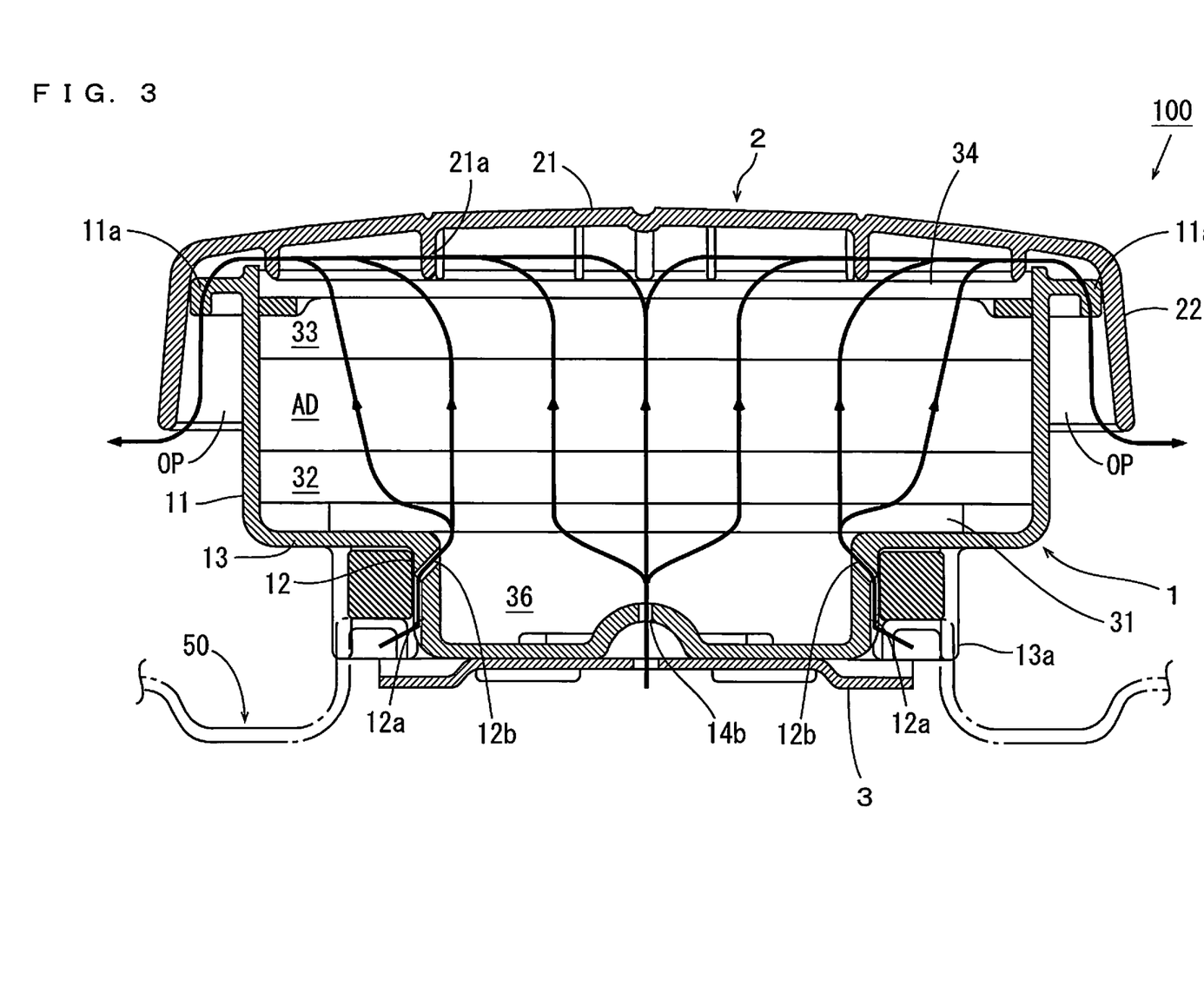
FIG. 3 is a diagram for explaining a flow of fuel vapor in the fuel cap.

FIG. 3 is a diagram for explaining a flow of the fuel vapor in the fuel cap 100. As shown in FIG. 3, the fuel vapor led into the inner housing 1 through the connection holes 12b, 14b sequentially passes through the porous filling member 36, the lower air-permeable layer 31, the lower porous member 32, the adsorbent AD, the upper porous member 33, and the upper air-permeable layer 34, in this order. In this case, a harmful component (hydrocarbon, for example) included in the fuel vapor is absorbed by the adsorbent AD.

The fuel vapor that has passed through the upper air-permeable layer 34 flows to the outside of the outer peripheral portion 212 (FIG. 2) through the clearances DA, DB (FIG. 2) of the pressure portion 21a of the outer housing 2. Further, the fuel vapor flows downward through clearances (not shown) between the side surface portion 22 of the outer housing 2 and the projection pieces 11a of the inner housing 1, and is discharged to the outside of the fuel cap 100 through the opening OP.

When a temperature of the fuel vapor is lowered in the inner space defined by the inner housing 1 and the outer housing 2, the fuel vapor may liquefy. When the adsorbent AD is moistened by the liquefied fuel, and the adsorbent AD adheres to the lower air-permeable layer 31 and the upper air-permeable layer 34, the lower air-permeable layer 31 and the upper air-permeable layer 34 are clogged. In this case, breathability of each of the lower air-permeable layer 31 and the upper air-permeable layer 34 is reduced, and the fuel vapor cannot be appropriately discharged from the fuel cap 100.

Further, when vibration from an internal combustion engine and the like is applied to the adsorbent AD, the adsorbent AD is crushed. When the crushed adsorbent AD is moistened and adheres to the lower air-permeable layer 31 and the upper air-permeable layer 34, clogging of the lower air-permeable layer 31 and the upper air-permeable layer 34 is more likely to occur.

In the fuel cap 100 according to a preferred embodiment of the present invention, the lower porous member 32 is disposed between the adsorbent AD and the lower air-permeable layer 31, and the upper porous member 33 is disposed between the adsorbent AD and the upper air-permeable layer 34. Thus, even when the fuel vapor liquefies in the inner space defined by the inner housing 1 and the outer housing 2, the liquefied fuel is absorbed by the upper porous member 33 and the lower porous member 32. Therefore, the adsorbent AD is unlikely to be moistened.

Further, even when the adsorbent AD is moistened, the lower porous member 32 prevents the adsorbent AD from coming into contact with the lower air-permeable layer 31, and the upper porous member 33 prevents the adsorbent AD from coming into contact with the upper air-permeable layer 34. Thus, the moistened adsorbent AD is prevented from adhering to the lower air-permeable layer 31 and the upper air-permeable layer 34, and a reduction in breathability of each of the lower air-permeable layer 31 and the upper air-permeable layer 34 is prevented.

Further, because the density of each of the lower porous member 32 and the upper porous member 33 is lower than the density of each of the lower air-permeable layer 31 and the upper air-permeable layer 34, even when the moistened adsorbent AD comes into contact with the lower porous member 32 and the upper porous member 33, clogging of the lower porous member 32 and the upper porous member 33 hardly occurs. Therefore, breathability of each of the lower porous member 32 and the upper porous member 33 is not largely reduced.

On the other hand, the density of each of the lower air-permeable layer 31 and the upper air-permeable layer 34 is higher than the density of each of the lower porous member 32 and the upper porous member 33 such that the adsorbent AD cannot pass through the lower air-permeable layer 31 and the upper air-permeable layer 34. Thus, leakage of the adsorbent AD to the outside of the housing 10 is prevented.

Further, in the case in which the lower porous member 32 and the upper porous member 33 are made of a material having a high elastic limit such as a sponge, the lower porous member 32 and the upper porous member 33 define and function as buffers. Thus, kinetic energy of the adsorbent AD is absorbed, and the adsorbent AD is unlikely to be crushed. Therefore, clogging of the lower air-permeable layer 31 and the upper air-permeable layer 34 is more unlikely to occur.

Further, in the case in which a liquid surface of the fuel in the fuel tank 50 is close to the fuel cap 100, the liquefied fuel may enter the inner housing 1 from the connection holes 12b, 14b of the lower side surface portion 12 and the bottom surface portion 14. Even in that case, the lower porous member 32 and the porous filling member 36 are closer to the liquid surface of the fuel than the adsorbent AD is to the liquid surface of the fuel, such that the liquefied fuel that has entered the inner housing 1 is absorbed by the lower porous member 32 and the porous filling member 36. Thus, the adsorbent AD is prevented from being moistened by the liquefied fuel that has entered the inner housing 1.

In this manner, in the fuel cap 100 according to a preferred embodiment of the present preferred embodiment, the adsorbent AD is prevented from being moistened. Even in the case in which the adsorbent AD is moistened, clogging of the lower air-permeable layer 31 and the upper air-permeable layer 34 is prevented. Therefore, the fuel vapor from which a harmful component has been removed by the adsorbent AD is appropriately discharged to the outside of the fuel tank 50.

Figure 4:
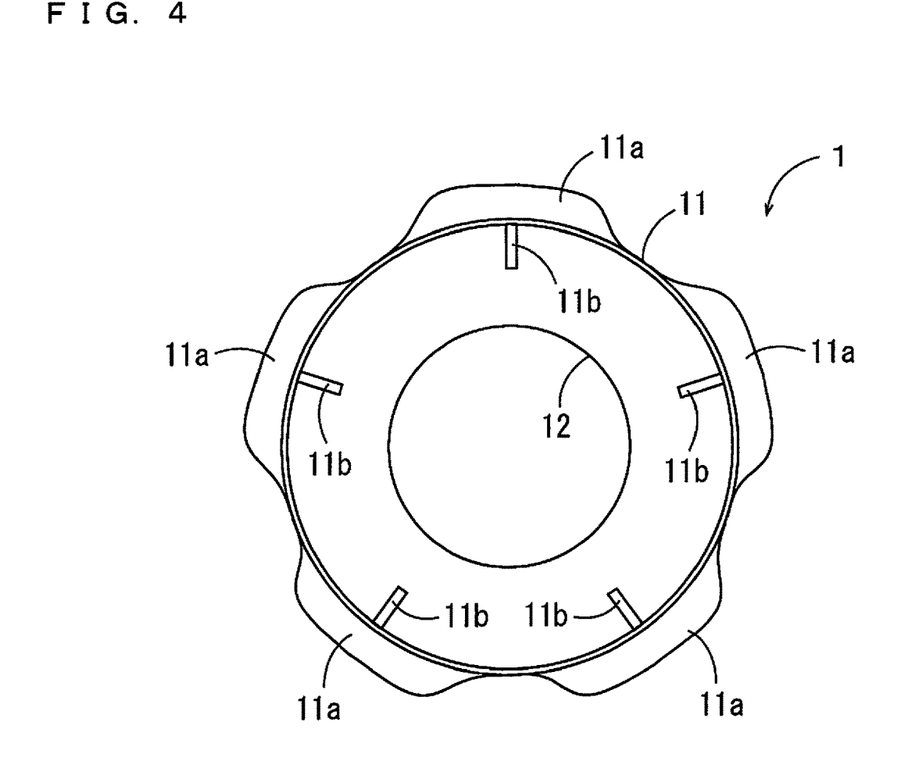
FIG. 4 is a plan view of an inner housing.
Figure 5:
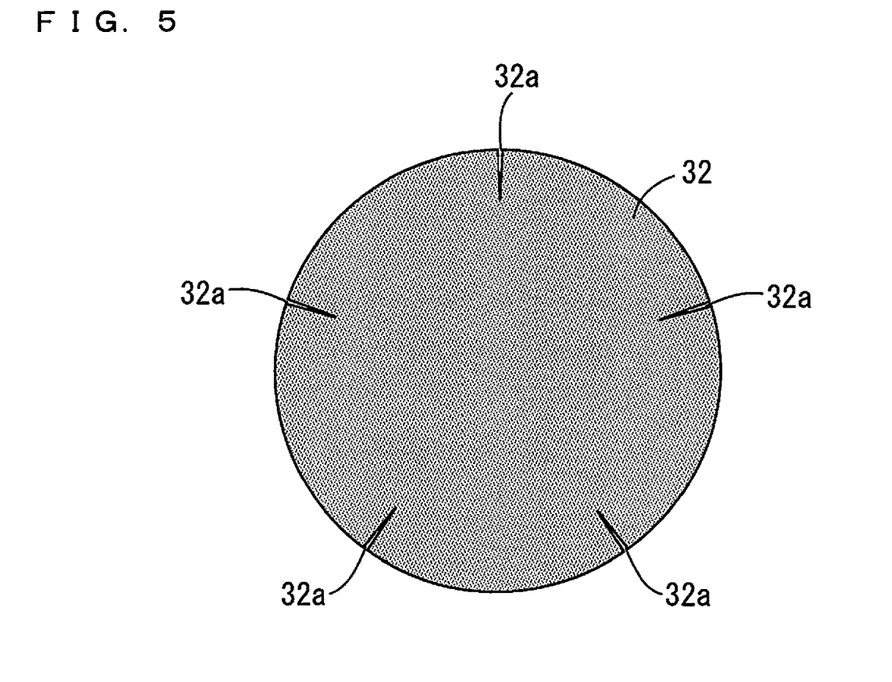
FIG. 5 is a plan view of a lower porous member.
Figure 6A:
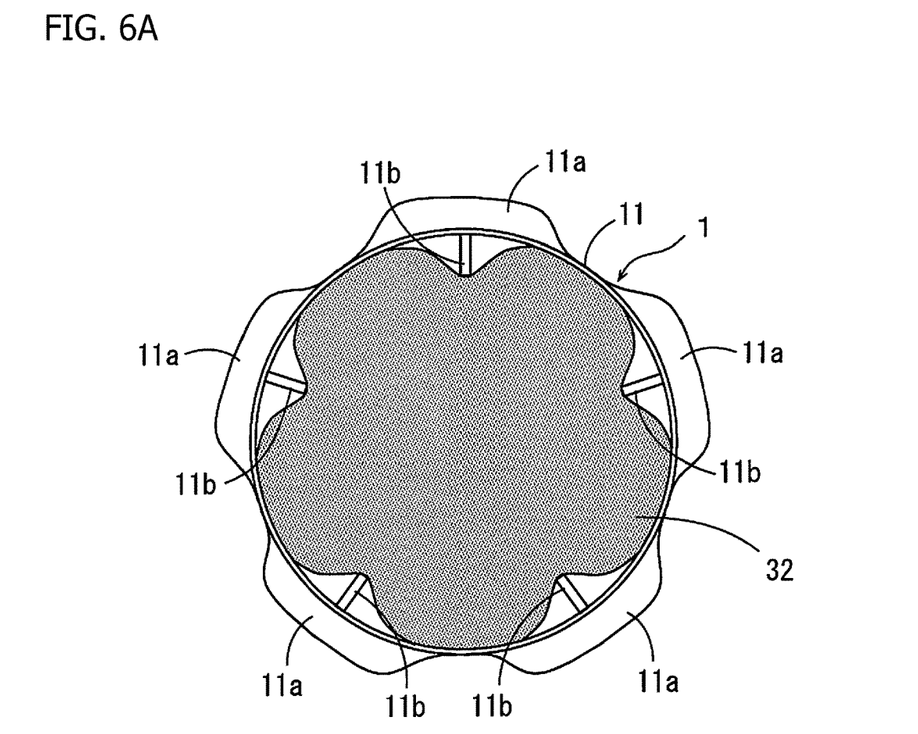
FIGS. 6A and 6B are diagrams showing a relationship between the inner housing and the lower porous member.
Figure 6B:
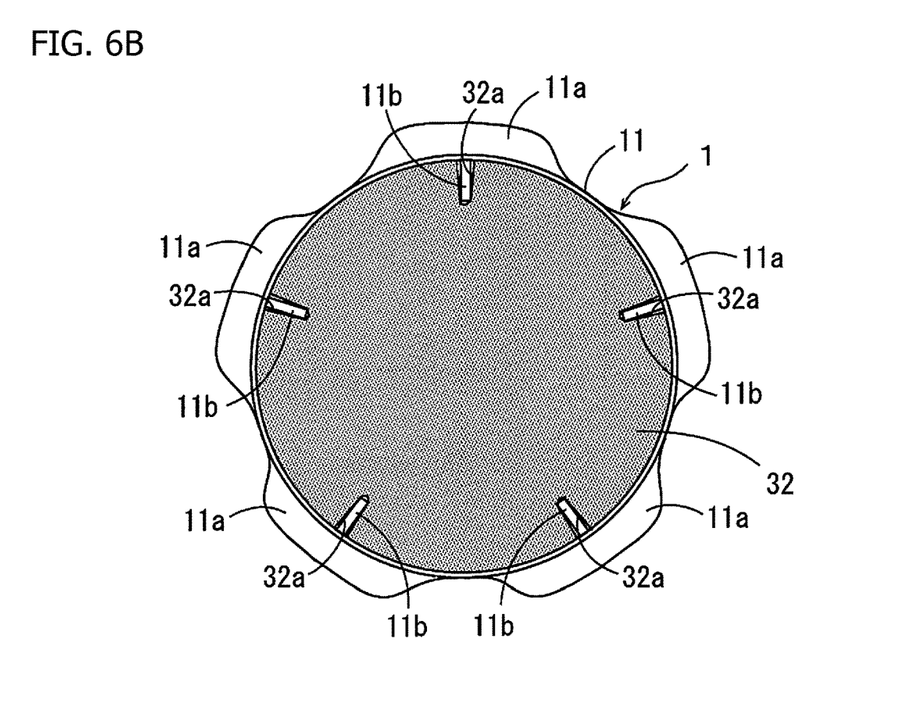

A relationship between the supporters 11b of the inner housing 1 and another member will be described. FIG. 4 is a plan view of the inner housing 1, and FIG. 5 is a plan view of the lower porous member 32. FIGS. 6A and 6B are diagrams showing a relationship between the inner housing 1 and the lower porous member 32. The upper porous member 33 has a shape similar to that of the lower porous member 32 of FIG. 5. A relationship between the inner housing 1 and the upper porous member 33 is similar to a relationship between the inner housing 1 and the lower porous member 32.

As shown in FIG. 4, the plurality (preferably five in the present example) of supporters 11b are provided at the inner peripheral surface of the upper side surface portion 11 at equal angular intervals. Further, as shown in FIG. 5, a plurality (preferably five in the present example) of slits 32a are provided in a peripheral edge of the lower porous member 32 at equal or substantially equal angular intervals to correspond to the plurality of supporters 11b.

If the slits 32a are not provided in the lower porous member 32, the lower porous member 32 is deformed by the supporters 11b as shown in FIG. 6A. Thus, clearances are provided between the lower porous member 32 and the inner peripheral surface of the upper side surface portion 11 of the inner housing 1 around the supporters 11b. In this case, the adsorbent AD may come into contact with the lower air-permeable layer 31 through the clearances. Therefore, clogging of the lower air-permeable layer 31 is likely to occur.

In the present preferred embodiment, as shown in FIG. 6B, the lower porous member 32 is disposed inside of the upper side surface portion 11 such that each supporter 11b is fitted into each slit 32a of the lower porous member 32. Thus, deformation of the lower porous member 32 is prevented, and a clearance between the lower porous member 32 and the inner peripheral surface of the upper side surface portion 11 is prevented. Therefore, the adsorbent AD is prevented from coming into contact with the lower air-permeable layer 31. Similarly, a clearance between the upper porous member 33 and the inner peripheral surface of the upper side surface portion 11 is prevented. Therefore, the adsorbent AD is prevented from coming into contact with the upper air-permeable layer 34.

Figure 7:
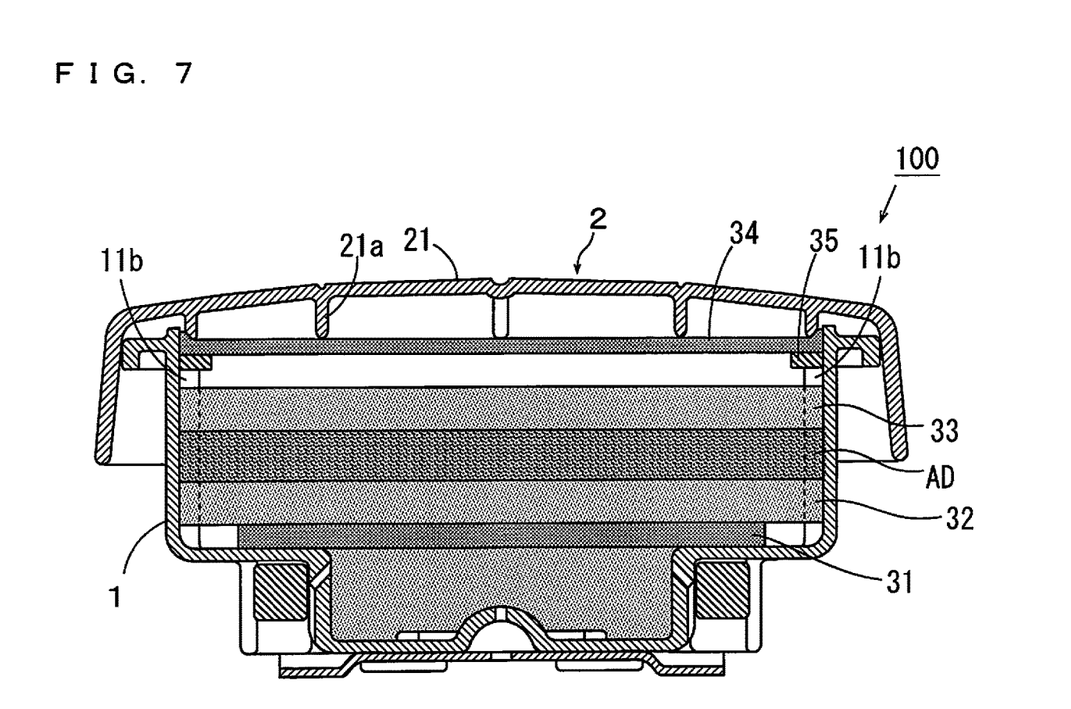
FIG. 7 is a diagram for explaining a function of the supporters.

FIG. 7 is a diagram for explaining the function of the supporters 11b. As described above, the adsorbent AD may be crushed by vibration. When crushing of the adsorbent AD progresses, a volume of the adsorbent AD decreases. If the supporters 11b are not provided, the upper porous member 33 and the upper air-permeable layer 34 move downward due to the crushing of the adsorbent AD. In this case, an attitude of the upper air-permeable layer 34 becomes unstable, and a clearance may be provided between the upper air-permeable layer 34 and the inner peripheral surface of the upper side surface portion 11. Thus, the adsorbent AD may leak through the clearance.

In the present preferred embodiment, as shown in FIG. 7, the pressing member 35 abuts against upper ends of the supporters 11b, so that the downward movement of the upper air-permeable layer 34 is restricted. Therefore, the upper air-permeable layer 34 is stably held between the pressing member 35 and the pressure portion 21a of the outer housing 2, and the attitude of the upper air-permeable layer 34 is prevented from changing. Thus, leakage of the adsorbent AD is prevented.

As for the fuel cap 100 according to the above-described preferred embodiments, an accelerated test under a severe environment was carried out. Further, as a comparative example, a similar accelerated test for a fuel cap, which has the configuration similar to that of the above-described preferred embodiments except that the lower porous member 32 and the upper porous member 33 are not provided, was also carried out.

In the accelerated test, an engine (internal combustion engine) provided with the fuel tank 50 was continuously operated at a high temperature. Further, fuel was added often such that an amount of fuel in the fuel tank 50 is not reduced to be equal to or lower than a certain value. Under such a condition, fuel vapor is continuously generated, and vibration is continuously applied to the fuel cap 100. Thus, the adsorbent AD is likely to be moistened and crushed. Therefore, breathability of each of the lower air-permeable layer 31 and the upper air-permeable layer 34 is likely to be reduced, and the pressure in each of the fuel tank 50 and the fuel cap 100 is likely to increase. When the pressure in the fuel tank 50 increases, and the pressure in the fuel cap 100 is excessively high, the upper air-permeable layer 34 may be deformed, and the adsorbent AD may leak from the opening OP of the fuel cap 100.

A time period from the time when the test is started until the time when the pressure in the fuel tank 50 exceeds a prescribed value, or a time period from the time when the test is started until the time when the adsorbent AD leaks from the fuel cap 100, was measured as a function maintaining time period. As a result, the function maintaining time period of the fuel cap 100 according to the above-described preferred embodiments was about 2 times of a function maintaining time period of the fuel cap of the comparative example. From the above, it was discovered that, when the lower porous member 32 and the upper porous member 33 are provided, a reduction in breathability of each of the lower air-permeable layer 31 and the upper air-permeable layer 34 is prevented, and that a time period during which the fuel cap 100 appropriately functions increases.

Other Preferred Embodiments

While the adsorbent AD is preferably prevented from adhering to the upper air-permeable layer 34 by the upper porous member 33 in the above-described preferred embodiments, the present invention is not limited to this. Because gravity in a downward direction is exerted on the adsorbent AD, the adsorbent AD is unlikely to adhere to the upper air-permeable layer 34 located above the adsorbent AD as compared to the lower air-permeable layer 31 located below the adsorbent AD. Therefore, breathability of the upper air-permeable layer 34 is unlikely to be reduced as compared to the lower air-permeable layer 31. Then, in the case in which breathability in the fuel cap 100 is ensured, the upper porous member 33 does not have to be provided.

While the pressing member 35 preferably extends along the outer edge of the upper surface of the upper porous member 33 in the above-described preferred embodiments, the present invention is not limited to this. In the case in which the upper porous member 33 is not provided, or the case in which the upper porous member 33 is sufficiently pressed against the adsorbent AD, the pressing member 35 does not have to be provided.

In the above-described preferred embodiments, preferably the lower porous member 32 is stacked on the lower air-permeable layer 31, the adsorbent AD is stacked on the lower porous member 32, the upper porous member 33 is stacked on the adsorbent AD, and the upper air-permeable layer 34 is stacked on the upper porous member 33. However, the present invention is not limited to this. Another member having breathability may further be provided between the lower air-permeable layer 31 and the upper air-permeable layer 34. For example, a middle porous member having breathability may be provided between the lower air-permeable layer 31 and the lower porous member 32. In this case, the density of the middle porous member is preferably lower than the density of the lower air-permeable layer 31. Further, the middle porous member having breathability may be provided between the upper air-permeable layer 34 and the upper porous member 33. In this case, the density of the middle porous member is preferably lower than the density of the upper air-permeable layer 34.

While the lower air-permeable layer 31, the lower porous member 32, the adsorbent AD, the upper porous member 33 and the upper air-permeable layer 34 are preferably disposed inside of the inner housing 1 in the above-described preferred embodiments, the present invention is not limited to this. Any one of the lower air-permeable layer 31, the lower porous member 32, the adsorbent AD, the upper porous member 33 and the upper air-permeable layer 34 may be disposed inside of the outer housing 2.

While the supporters 11b that support the pressing member 35 are preferably provided in the inner housing 1 in the above-described preferred embodiments, the present invention is not limited to this. The supporters that support the pressing member 35 may be provided in the outer housing 2.

In the following paragraphs, non-limiting examples of correspondences between various elements recited in the claims below and those described above with respect to various preferred embodiments of the present invention are explained.

In the above-mentioned preferred embodiments, the fuel cap 100 is an example of a fuel cap, the housing 10 is an example of a housing, the adsorbent AD is an example of an adsorbent, the lower air-permeable layer 31 is an example of a first porous layer, the upper air-permeable layer 34 is an example of a second porous layer, the lower porous member 32 is an example of a first porous member, and the upper porous member 33 is an example of a second porous member. Further, the pressing member 35 is an example of a pressing member, the inner housing 1 is an example of a first housing, the outer housing 2 is an example of a second housing member, the supporter 11*b* is an example of a supporter, and the slit 32*a* is an example of a slit.

As each of constituent elements recited in the claims, various other elements having configurations or functions described in the claims can be also used.

Preferred embodiments of the present invention can be effectively utilized for various types of fuel caps attached to a fuel tank.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A fuel cap attached to a fuel tank, the fuel cap comprising:
   a housing including an inner space through which vapor generated in the fuel tank flows upward from below;
   a granular adsorbent stored in the inner space;
   a first porous layer disposed below the adsorbent in the inner space;
   a second porous layer disposed above the adsorbent in the inner space; and
   a plate-shaped first porous member disposed between the adsorbent and the first porous layer; wherein
   a density of the first porous member is lower than a density of the first porous layer and a density of the second porous layer.

2. The fuel cap according to claim 1, wherein the first porous member has an elastic limit higher than an elastic limit of the first porous layer.

3. The fuel cap according to claim 1, wherein the first porous member is made of a sponge material.

4. The fuel cap according to claim 1, further comprising a plate-shaped second porous member disposed between the adsorbent and the second porous layer; wherein
   a density of the second porous member is lower than the density of the first porous layer and the density of the second porous layer.

5. The fuel cap according to claim 4, wherein the second porous member has an elastic limit higher than an elastic limit of the second porous layer.

6. The fuel cap according to claim 5, wherein the second porous member is made of a sponge material.

7. The fuel cap according to claim 5, further comprising a pressing member extending along an outer edge of an upper surface of the second porous member; wherein
   the housing includes a first housing member and a second housing member that define the inner space;
   the adsorbent is stored in the first housing member; and
   the pressing member presses down the second porous member due to the second housing member being connected to the first housing member.

8. The fuel cap according to claim 7, further comprising a supporter that supports a lower surface of the pressing member and projects from an inner surface of the housing.

9. The fuel cap according to claim 8, further comprising:
   a slit extending in an up-and-down direction in each of outer peripheral surfaces of the first porous member and the second porous member; wherein
   the supporter extends in the up-and-down direction and is fitted into the slit.

10. The fuel cap according to claim 1, wherein the first porous layer and the second porous layer are made of non-woven fabric.

* * * * *